United States Patent

Ohkubo et al.

[19]

[11] Patent Number: 6,021,165
[45] Date of Patent: *Feb. 1, 2000

[54] DIGITAL BROADCAST RECEIVER AND METHOD OF TUNING CONTROL

[75] Inventors: Tadatoshi Ohkubo; Kenichi Taura; Yoshiharu Ohsuga; Masahiro Tsujishita, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,545

[22] Filed: Feb. 6, 1997

[30] Foreign Application Priority Data

Feb. 9, 1996 [JP] Japan ................... 8-024049

[51] Int. Cl.⁷ .................................................. H04L 27/06
[52] U.S. Cl. .......................... 375/344; 375/329; 348/731
[58] Field of Search ................... 375/316, 340, 375/349, 362, 374, 355, 371, 260, 329, 344; 370/503, 516; 331/16; 348/731, 732, 733; 455/77, 150.1, 182.3, 192.1, 192.2, 192.3; 327/304–307

[56] References Cited

U.S. PATENT DOCUMENTS

| | | |
|---|---|---|
| 4,887,050 | 12/1989 | Borth et al. . |
| 5,239,400 | 8/1993 | Liu ......................................... 359/125 |
| 5,444,697 | 8/1995 | Leung et al. ............................. 370/516 |
| 5,450,456 | 9/1995 | Mueller . |
| 5,471,464 | 11/1995 | Ikeda ....................................... 375/364 |
| 5,790,784 | 8/1998 | Beale et al. ......................... 395/200.01 |

FOREIGN PATENT DOCUMENTS

| | | |
|---|---|---|
| 0367214 | 5/1990 | European Pat. Off. . |
| 0529421A2 | 3/1993 | European Pat. Off. . |
| 4335228A1 | 5/1995 | Germany . |
| 2295071 | 5/1996 | United Kingdom . |
| 9300747 | 1/1993 | WIPO . |

OTHER PUBLICATIONS

Schulze, H., "Digital Audio Broadcasting (DAB) —Stand der Entwidklung", IN : Bosch Technische Berichte, 1991, Issue 54, pp. 17–25.

*Primary Examiner*—Chi H. Pham
*Assistant Examiner*—Bryan Webster

[57] ABSTRACT

To control the oscillation frequency of a local oscillator, a digital broadcast receiver demodulates a phase-reference symbol contained in an orthogonal frequency-division multiplexed broadcast signal. The resulting frequency-domain data are modified by multiplication with complex conjugates of the known data encoded in the phase-reference signal, under different assumed frequency offsets between the frequency-domain data and known data. The results are converted to time-domain data, yielding one time series for each assumed frequency offset. One value is taken from each time series, these values are compared, and the oscillation frequency is adjusted according to the comparison results.

A digital broadcast receiver for receiving a PSK-OFDM signal, having a local oscillator with a controllable oscillation frequency, a mixer for down-converting said PSK-OFDM signal to an intermediate-frequency signal by mixing said PSK-OFDM signal with a signal generated by said local oscillator, and demodulating circuits for obtaining an array of frequency-domain data from said intermediate-frequency signal, said array of frequency-domain data representing subcarrier phase information of said PSK-OFDM signal. The digital broadcast receiver further including a phase modifying means, an inverse-fast-Fourier-transform means, a peak detecting means, and a frequency-deviation detector. The digital broadcast receiver can also include a data selecting means in addition to the elements previously described.

75 Claims, 5 Drawing Sheets

DIGITAL BROADCAST RECEIVER AND METHOD OF TUNING CONTROL

BACKGROUND OF THE INVENTION

The present invention relates to a method of tuning a local oscillator to receive digital broadcasts that employ phase-shift keying (hereinafter, PSK) and orthogonal frequency-division multiplexing (hereinafter, OFDM), and to a digital broadcast receiver using this method.

OFDM broadcasts have multiple subcarrier signals, on which data are transmitted in parallel. In PSK-OFDM broadcasting, each subcarrier signal is modulated by phase-shift keying. The modulated subcarriers are combined and up-converted to the broadcast frequency to create the PSK-OFDM broadcast signal.

Reception of a PSK-OFDM signal requires that a local oscillator in the receiver generate a signal tuned in relation to the broadcast frequency. The local oscillator signal is used to down-convert the received signal to an intermediate-frequency signal, which is then demodulated to obtain the subcarrier phase-shift data. If the local-oscillator frequency is too high or too low, the demodulated phase shifts will be incorrect.

When quadrature phase-shift keying (QPSK) is employed, for example, the phase shifts have nominal radian values of zero, $\rho/2$, $\pi$, and $-\pi/2$. A conventional method of tuning control multiplies the demodulated phase data by four, modulo $2\pi$, so that these nominal values all become zero. The sum of the results for all subcarriers is a phase error signal which can be used to control the local oscillator. Correct tuning is maintained by controlling the frequency of the local oscillator so as to reduce the phase error signal to zero.

The conventional method suffers, however, from inherent ambiguity. If the frequency error of the local oscillator causes a phase error of $\pi/2$, or any integer multiple of $\pi/2$, multiplication by four will convert the phase error to zero, and the frequency error will go uncorrected. The conventional method is thus able to correct only small frequency errors, such as frequency errors causing phase errors of less than $\pi/4$ radians.

SUMMARY OF THE INVENTION

It is accordingly an object of the present invention to control the tuning of a digital broadcast receiver unambiguously.

The invented method tunes the oscillation frequency of a local oscillator in a digital broadcast receiver by receiving and demodulating a phase-reference symbol in a PSK-OFDM broadcast signal to obtain an array of frequency-domain data, then multiplying this array of frequency-domain data element-wise by an array of complex conjugates of the known data encoded in the phase-reference signal. The demodulated frequency-domain data and the known data both comprise one value for each subcarrier frequency in the PSK-OFDM signal.

The multiplication step is carried out once on the assumption of a frequency offset of zero between the demodulated frequency-domain data and the known data, thereby obtaining a first array of modified data, and at least once on the assumption of a non-zero frequency offset, thereby obtaining at least one additional array of modified data. All arrays of modified data thus obtained are transformed to the time domain by an inverse fast Fourier transform, thereby obtaining a first time series, representing the frequency offset of zero, and at least one additional time series, representing a non-zero frequency offset.

A peak value is detected in the first time series. An additional value is taken from each additional time series. The peak value and additional value or values are compared, and the oscillation frequency of the local oscillator is adjusted according to the comparison results.

According to one aspect of the invention, the additional values are peak values detected in the additional time series, and the oscillation frequency is adjusted according to the frequency offset represented by the time series in which the largest peak value is detected. Large frequency errors can be corrected unambiguously in this way.

According to another aspect of the invention, the additional values taken from the additional time series are the values of these time series at a time at which the peak value was attained in the first time series. Small frequency errors can be corrected accurately in this way.

According to yet another aspect of the invention, the Fourier transform of the phase-reference symbol is subtracted from the array of frequency-domain data before these data are multiplied under the assumption of a non-zero frequency offset. Small frequency errors can be corrected still more accurately in this way.

BRIEF DESCRIPTION OF THE DRAWINGS

In the attached drawings.

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
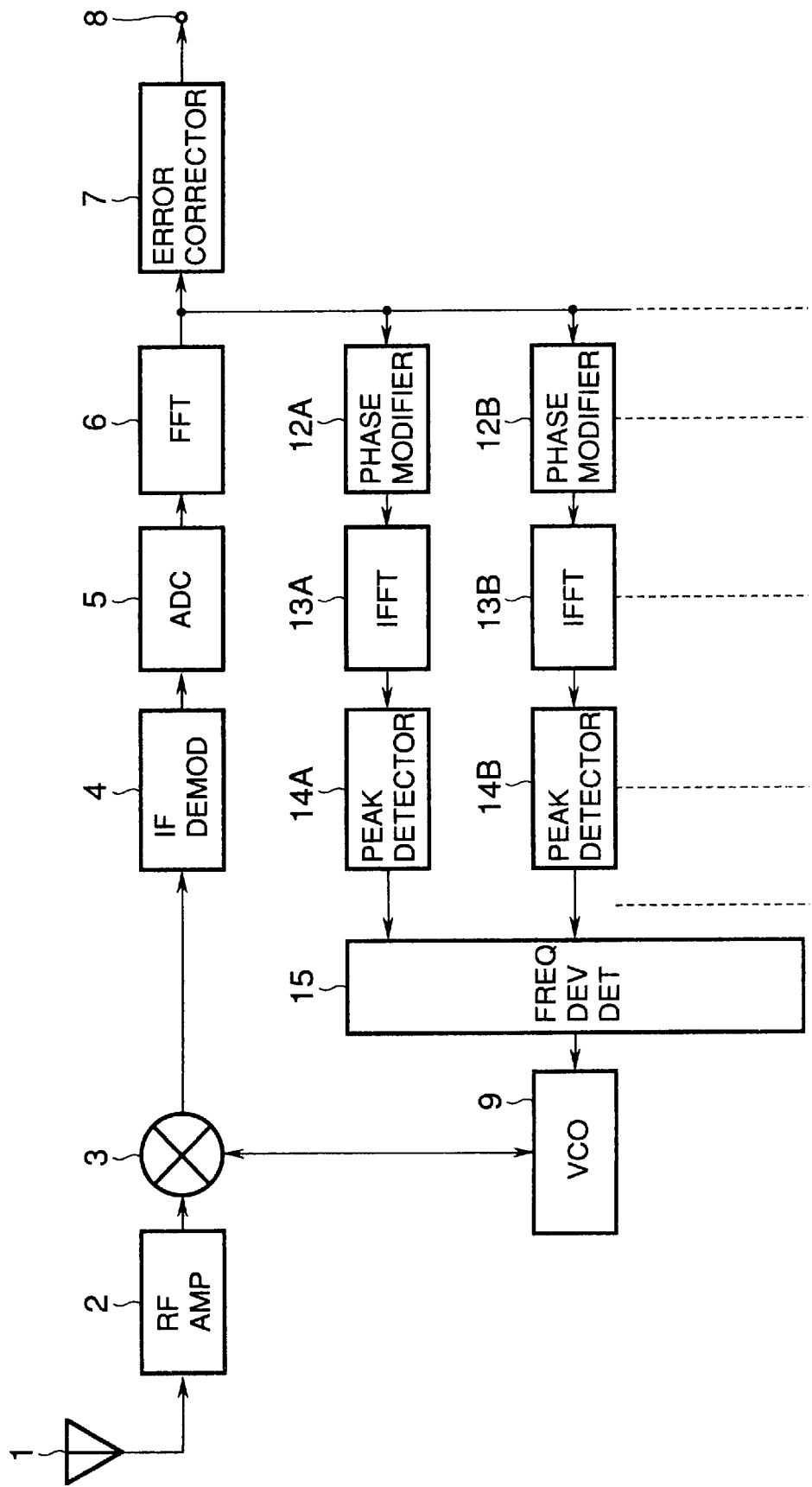
FIG. 1 is a block diagram of a first embodiment of the invented digital broadcast receiver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of the invention will be described with reference to the attached illustrative drawings, following a brief description of the PSK-OFDM digital broadcasting system.

The number K of subcarrier signals employed in OFDM digital broadcasting is typically large: one system employs one thousand five hundred thirty-six subcarrier signals (K=1536), for example. The K subcarrier signals have a constant frequency spacing $F_s$. The OFDM signal is broadcast as a continuous series of frames, each consisting of a certain number M of OFDM symbols. Each OFDM symbol comprises K sub-symbols, one sub-symbol being encoded per subcarrier. In QPSK-OFDM, the sub-symbols represent the dibits '00,' '01,' '10,' and '11,' which are mapped onto the complex numbers $1, j, -1$, and $-j$ (where j is a square root of minus one), and are encoded as subcarrier phase shifts of zero, $\pi/2$, $\pi$, and $-\pi/2$ radians.

The subcarrier signals are combined by complex addition. One frame of the resulting signal s(t) can be described by equation (1) below, in which t is a time variable, $T_s$ is the duration of one symbol, $Z_{m,k}$ is the complex value $(1, j, -1,$ or $-j)$ of the m-th sub-symbol transmitted on the k-th subcarrier, and k ranges over the integers from $-K/2$ to $K/2$, inclusive.

$$s(t) = \sum_{m=0}^{M-1} \sum_{k=-K/2}^{K/2} z_{m,k} b(t - mT_S) \exp[2j\pi k F_S(t - mT_S)] \quad (1)$$

The symbol exp denotes the exponential function. The letter b denotes a function equal to unity on the interval between zero and $T_s$, and equal to zero elsewhere, as defined by equation (2) below.

$$b(t) = \begin{matrix} 1 & 0 < t < T_S \\ 0 & \text{otherwise} \end{matrix} \quad (2)$$

The first symbol (m=0) in each frame is a null symbol, in which the signal level is reduced to zero to indicate the beginning of the frame, as described in equation (3).

$$z_{0,k} = 0 \quad (k=-K/2, \ldots, K/2) \quad (3)$$

The next symbol (m=1) is a phase-reference symbol containing known data $z_k$ for each subcarrier. The known data $z_k$ vary according to the value of k in a pattern that may be regular, but must not repeat cyclically. These known data become the values of $z_{1,k}$ in each frame, as indicated by equation (4).

$$z_{1,k} = z_k \quad (k=-K/2, \ldots, K/2) \quad (4)$$

The known data $z_k$ combine to give the reference-symbol waveform x(t) described by equation (5) below. This is the waveform produced in the transmitter, before up-conversion to the broadcast frequency.

$$x(t) = \sum_{k=-K/2}^{K/2} z_k b(t - T_S) \exp[2j\pi k F_S(t - T_S)] \quad (5)$$

First Embodiment

A first embodiment of the invented method of tuning control, and a first embodiment or the invented digital broadcast receiver, will be described with reference to FIG. 1, which is a block diagram of the digital broadcast receiver.

The conventional part of this digital broadcast receiver comprises an antenna 1 that receives a PSK-OFDM broadcast signal, a radio-frequency amplifier (RF AMP) 2 that amplifies the received broadcast signal, a mixer 3 that down-converts the amplified signal to an intermediate-frequency (IF) signal, an IF demodulator (DEMOD) 4 that demodulates the IF signal orthogonally to produce in-phase (I) and quadrature (Q) baseband signals, an analog-to-digital converter (ADC) 5 that converts the in-phase and quadrature baseband signals to digital signals, a fast-Fourier-transform processor 6 that executes a fast Fourier transform (FFT) on these digital signals to obtain the sub-symbol data for each subcarrier, an error corrector 7 that perform error correction, an output terminal 8 to which the sub-symbol data are supplied, and a voltage-controlled oscillator (VCO) 9. The voltage-controlled oscillator 9 is used as a local oscillator that supplies the mixer 3 with a signal tuned to a frequency differing from the PSK-OFDM broadcast frequency by a fixed amount.

The novel part of this digital broadcast receiver comprises a plurality of phase modifiers 12A, 12B, . . . , a like plurality of inverse-fast-Fourier-transform (IFFT) processors 13A, 13B, . . . , a like plurality of peak detectors 14A, 14B, . . . , and a frequency-deviation detector (FREQ DEV DET) 15. In each frame, these elements operate on the array of frequency-domain data which the fast-Fourier-transform processor 6 produces from the demodulated and digitized phase-reference symbol. This array of frequency-domain data comprises one complex value $X'(\omega_k)$ for each subcarrier $(k=-K/2, \ldots, K/2)$.

The frequency-domain data $X'(\omega_k)$ $(k=-K/2, \ldots, K/2)$ are supplied simultaneously from the FFT processor 6 to all of the phase modifiers 12A, 12B, . . . . These phase modifiers multiply the array of frequency-domain data by an array of the complex conjugates $Z_k^*$ of the known values of the phase-reference data, under the assumption of various frequency offsets between the two arrays. Each frequency offset is equal to the subcarrier frequency spacing $F_s$ multiplied by an integer i, and can be expressed as an offset of i between the array subscript values. The phase modifiers thus perform multiplication operations of the following form, for various integers i.

$$Y'_i(\omega_k) = X'(\omega_k) z_{k-i}^* \quad (6)$$

Phase modifier 12A assumes a frequency offset of zero (i=0), and produces modified data $Y'_0(\omega_k)$ equal to $X'(\omega_k) z_k^*$. Phase modifier 12B assumes a positive frequency offset equal to $F_s$ (i=1), and produces modified data $Y'_1(\omega_k)$ equal to $X'(\omega_k) z_{k-1}^*$. Phase modifier 12C (not visible) assumes a negative frequency offset equal to $F_s$ (i=-1), and produces modified data $Y'_{-1}(\omega_k)$ equal to $X'(\omega_k) z_{k+1}^*$. Modified data are produced for at least these three assumed frequency offsets (i=0, 1, and -1).

The phase modifiers 12A, 12B, . . . supply the modified data $Y'_i(\omega_k)$ to respective IFFT processors 13A, 13B, . . . , which execute the inverse fast. Fourier transform, transforming the modified data to the time domain. For each integer i, a time series . . . , $y_i(t)$, . . . is obtained, in which t is a discrete time variable $(t=t_{-K/2}, \ldots, t_{K/2})$. Each time series represents a digitized, complex-valued waveform, and is associated with a frequency offset represented by the above integer i.

The time-series data are passed to respective peak detectors 14A, 14B, . . . . Each peak detector detects the data value having the largest absolute value in the received time series, and supplies this as a peak value to the frequency-deviation detector 15.

The frequency-deviation detector 15 compares the peak values received from the peak detectors 14A, 14B, . . . , finds the largest peak value, and controls the oscillation frequency of the voltage-controlled oscillator 9 according to the frequency offset (value of i) associated with the time series in which the largest peak value was detected. The oscillation frequency is altered in one direction if the frequency offset is positive, and in the opposite direction if the frequency offset is negative. Specifically, the oscillation frequency is decreased if i is positive, increased if i is negative, and left unchanged if i is equal to zero. If more frequency offsets than the three noted above (i=0, 1, and −1) are employed, the amount of increase or decrease in the oscillation frequency can be made to depend on the magnitude of i.

The above operation tunes the voltage-controlled oscillator 9 in such a way as to move the oscillation frequency toward the correct frequency, even if the original frequency error exceeds the subcarrier frequency spacing $F_s$. The reason for this will be explained next.

The phase-reference symbol shown in equation (5) is the sum of phase-reference sub-symbols $x_k(t)$ of the form given by equation (7).

$$x_k(t)=z_k b(t-T_s)\exp[2j\pi kF_s(t-T_s)] \quad (7)$$

A Fourier transform converts $x_k(t)$ to the following frequency-domain function $X_k(\omega)$, in which $\omega$ is a frequency variable, $\omega_k$ is equal to $2\pi kF_sT_s$, and $\theta$ is a constant.

$$X_k(\omega) = z_k \frac{\sin\frac{\omega-\omega_k}{2}}{\frac{\omega-\omega_k}{2}}\exp\left(-j\frac{\omega-\omega_k-\theta}{2}\right) \quad (8)$$

Figure 4:
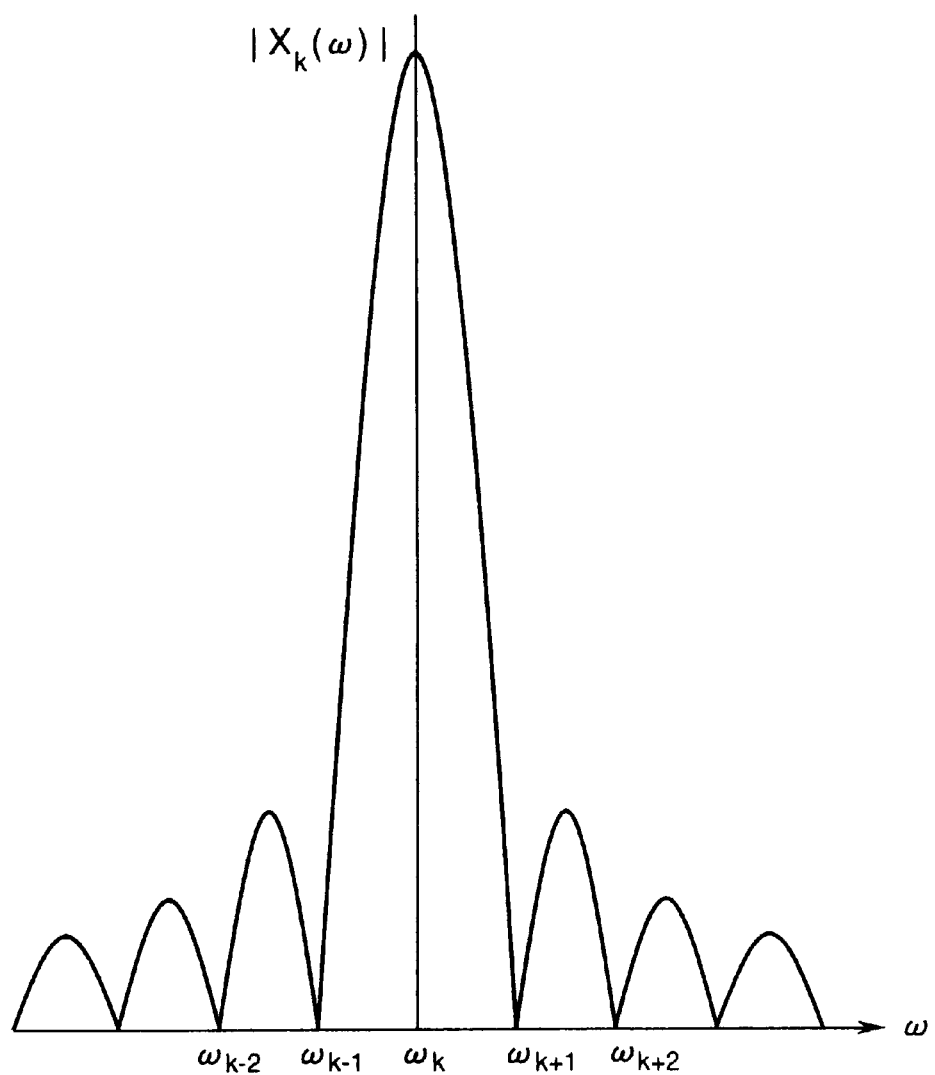
FIG. 4 is a graph of the Fourier transform of a phase-reference sub-symbol.

The absolute value $|X_k(\omega)|$ of this function is illustrated in FIG. 4.

Equation (5), describing the waveform of the phase-reference symbol, is equivalent to the following equation (9).

$$x(t) = \sum_{k=-K/2}^{K/2} x_k(t) \quad (9)$$

Similarly, the Fourier transform $X(\omega)$ of $x(t)$ can be written as in equation (10).

$$X(\omega) = \sum_{k=-K/2}^{K/2} x_k(\omega) \quad (10)$$

The values of $X(\omega_{-K/2}), \ldots X(\omega_{K/2})$ can be calculated efficiently by means of the fast Fourier transform. As implied by the above equations (7), (8), and (9) and illustrated in FIG. 4, $X_i(\omega_k)$ is zero when i≠k, so equation (10) yields the following equation (11).

$$X(\omega_k)=X_k(\omega_k) \quad (11)$$

If the voltage-controlled oscillator 9 is accurately tuned to the broadcast frequency, the received phase-reference data $X'(\omega_k)$ will be identical to the above $X(\omega_k)$ for all k from −K/2 to K/2, and the modified data produced by phase modifier 12A will be the data $Y(\omega_k)$ equal to $X(\omega_k)z_k^*$. From equation (8), since $z_k z_k^*$ is always equal to unity, $Y(\omega_k)$ is the same for all values of k, having the value given by the following equation (12).

$$Y(\omega_k)=\exp(j\theta/2) \quad (12)$$

Equation (12) describes the Fourier transform of an infinite impulse function, the location of the impulse being determined by the value of $\theta$. The inverse Fourier transform performed by IFFT processor 13A therefore produces a time series similar to an impulse function, with a single large peak value.

The other IFFT processors 13B, . . . do not produce impulse-like time series, because when the integer i is not zero, $z_k z_{k-i}^*$ takes on various different values, depending on k. The peak values detected in these other time series will accordingly be comparatively small. The frequency-detector will receive the largest peak value from peak detector 14A (corresponding to i=0), and will leave the oscillation frequency of the voltage-controlled oscillator 9 unchanged, as desired.

If the voltage-controlled oscillator 9 is inaccurately tuned, and the phase-reference signal x'(t) output by the analog-to-digital converter 9 deviates by a frequency $\omega_n$ from the transmitted phase-reference signal x(t) given by equation (5) or (8), the modified data $Y'_i(\omega_{-K/2}), \ldots, Y'_i(\omega_{K/2})$ produced by the phase modifiers 12A, 12B, . . . will have the form given by equations (13) and (14).

$$Y'_i(\omega_k)=X'(\omega_k)z_{k-i}^* \quad (13)$$

$$Y'_i(\omega_k)=X(\omega_k-\omega_n)z_{k-i}^* \text{tm} (14)$$

If $\omega_n$ is equal to n times the frequency spacing $F_s$, where n is a positive or negative integer, then after the inverse Fourier transform performed by the IFFT processors 13A, 13B, . . . , an impulse-like time series will appear when i=n. When i≠n, the time series will not be impulse-like. If n is equal to one ($\omega_n=F_s$), for example, then a large peak value will be detected in the output of IFFT processor 13B, and smaller peak values will be detected in the output of the other IFFT processors. The frequency-deviation detector 15 will receive the largest peak value from peak detector 14B (corresponding to i=1), and will alter the oscillation frequency of the voltage-controlled oscillator 9 in the appropriate direction.

If n lies outside the range of frequency offsets (i) assumed by the phase modifiers 12A, 12B, . . . , the largest peak value will still tend to be round in the direction of n, so if n is positive, the largest peak value will correspond to a positive value of i, and if n is negative, the largest peak value will correspond to a negative value of i. Thus the frequency-deviation detector 15 will still alter the oscillation frequency of the voltage-controlled oscillator 9 in the right direction. The same is true when the frequency deviation is not an integer multiple of $F_s$.

The first embodiment is accordingly able to correct large frequency deviations without the ambiguity present in the prior art. Although the frequency-deviation detector 15 detects frequency deviations in multiples of $F_s$, the corrections applied to the voltage-controlled oscillator 9 need not be equal to the detected deviation; corrections can be applied in smaller increments, enabling the oscillation frequency to be kept close to the correct frequency once approximately correct tuning is achieved.

Second Embodiment

Figure 2:
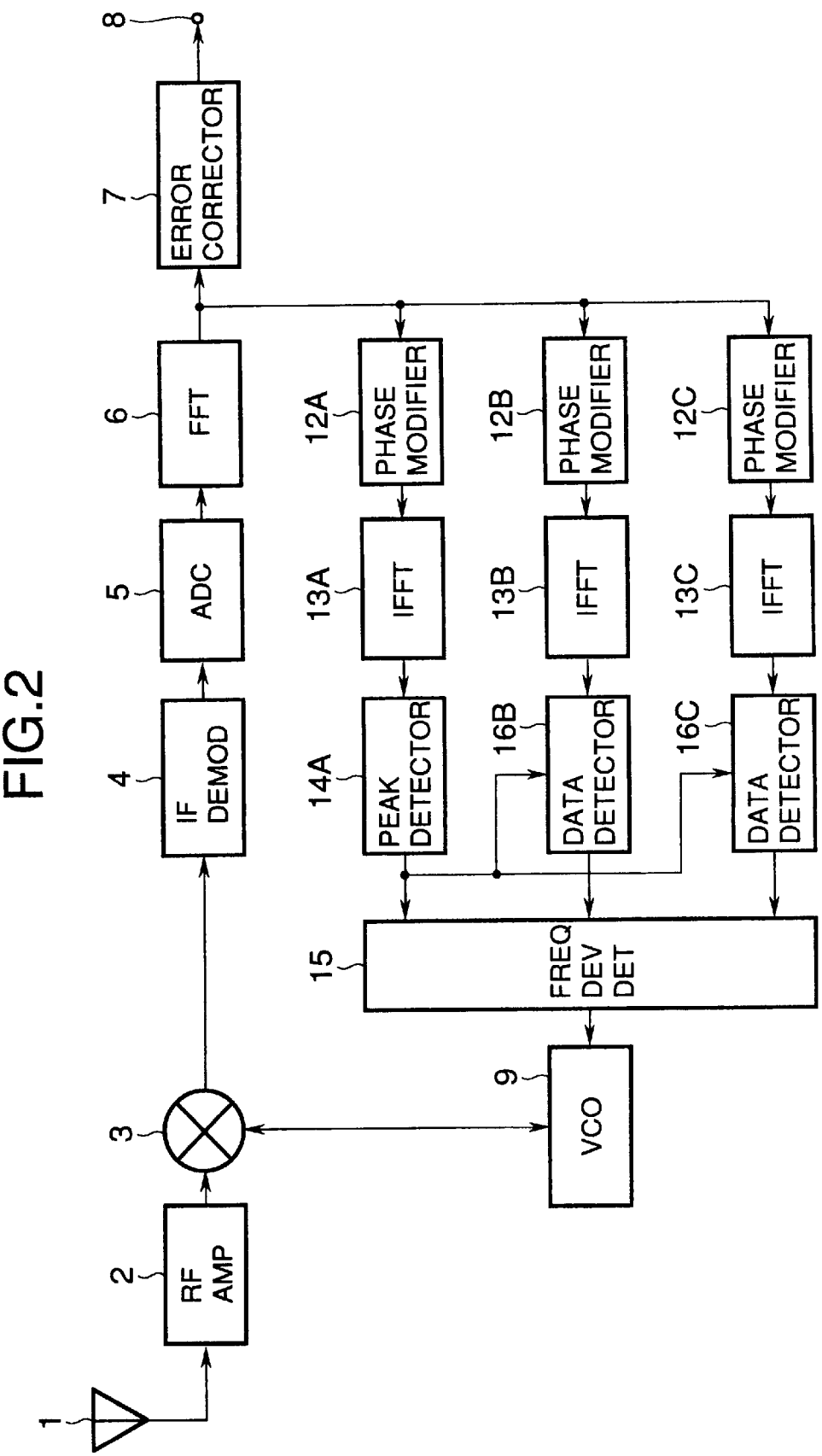
FIG. 2 is a block diagram of a second embodiment of the invented digital broadcast receiver.

A second embodiment of the invented method of tuning control, and a second embodiment of the invented digital broadcast receiver, will be described with reference to the block diagram in FIG. 2. The conventional elements with reference numerals 1 to 9 are the same as in the first embodiment; descriptions of these elements will be omitted.

The novel elements comprise three phase modifiers 12A, 12B, and 12C, three IFFT processors 13A, 13B, and 13C, and a peak detector 14A, all of which are the same as in the first embodiment. The frequency-deviation detector 15 operates somewhat differently from in the first embodiment. Two data detectors 16B and 16C are coupled between the frequency-deviation detector 15 and IFFT processors 13B and 13C, replacing peak detectors 14B and 14C in the first embodiment.

The operations performed by phase modifiers 12A, 12B, and 12C are as described in the first embodiment, with the same values of the integer i (0, 1, and −1). The IFFT processors 13A, 13B, and 13C produce respective time series $y_0(t)$, $y_1(t)$, and $y_{-1}(t)$ ($t=t_{-K/2}, \ldots, t_{K/2}$).

The peak detector 14A outputs both the peak value $y_0(t_p)$ in the time series $y_0(t)$ representing a frequency offset of zero, and the value $t_p$ of the time variable t at which the peak value occurs. The peak value $y_0(t_p)$ is output to the frequency-deviation detector 15. The time value $t_p$ is output to data detectors 16B and 16C.

Data detector 16B takes the value $y_1(t_p)$ of time series $y_1(t)$ at the peak time $t_p$ in time series $y_0(t)$, and supplies this value to the frequency-deviation detector 15. Similarly, data detector 16C takes the value $y_{-1}(t_p)$ from time series $y_{-1}(t)$, and supplies this value to the frequency-deviation detector 15.

The frequency-deviation detector 15 compares the values received from the peak detector 14A and data detectors 16B and 16C, and adjusts the oscillation frequency of the voltage-controlled oscillator 9 as follows. If $y_1(t_p)$ and $y_{-1}(t_p)$ both differ from $y_0(t_p)$ by less than a certain amount D, and if $y_1(t_p)$ is greater than $y_{-1}(t_p)$, the oscillation frequency is increased. Similarly, if $y_1(t_p)$ and $y_{-1}(t_p)$ both differ from $y_0(t_p)$ by less than D, and $y_1(t_p)$ is less than $y_{-1}(t_p)$, the oscillation frequency is decreased. In other cases, the oscillation frequency is left unchanged.

The increase or decrease can be a fixed amount, or the magnitude of the increase or decrease can be made to depend on the difference between $t_1(t_p)$ and $t_{-1}(t_p)$, or on the relative values of $t_0(t_p)$, $t_1(t_p)$, and $t_{-1}(t_p)$.

Next, the theory of operation of the second embodiment will be described.

If inaccurate tuning of the voltage-controlled oscillator 9 cause a frequency deviation $\Delta\omega$ when the received signal is down-converted, the received phase-reference data x'(t) output by the analog-to-digital converter 5 can be expressed as in equations (15) and (16).

$$x'(t) = x(t)\exp(j\Delta\omega t) \quad (15)$$

$$x'(t) = \sum_{k=-K/2}^{K/2} x_k(t)\exp(j\Delta\omega t) \quad (16)$$

The component $x'_k(t)$ of x'(t) corresponding to the k-th subcarrier is given by equation (17).

$$x'_k(t) = x_k(t)\exp(j\Delta\omega t) \quad (17)$$

The Fourier transform $X'_k(\omega)$ of $x'_k(t)$ is given by equation (18).

$$X'_k(\omega) = X_k(\omega - \Delta\omega) \quad (18)$$

Figure 5:
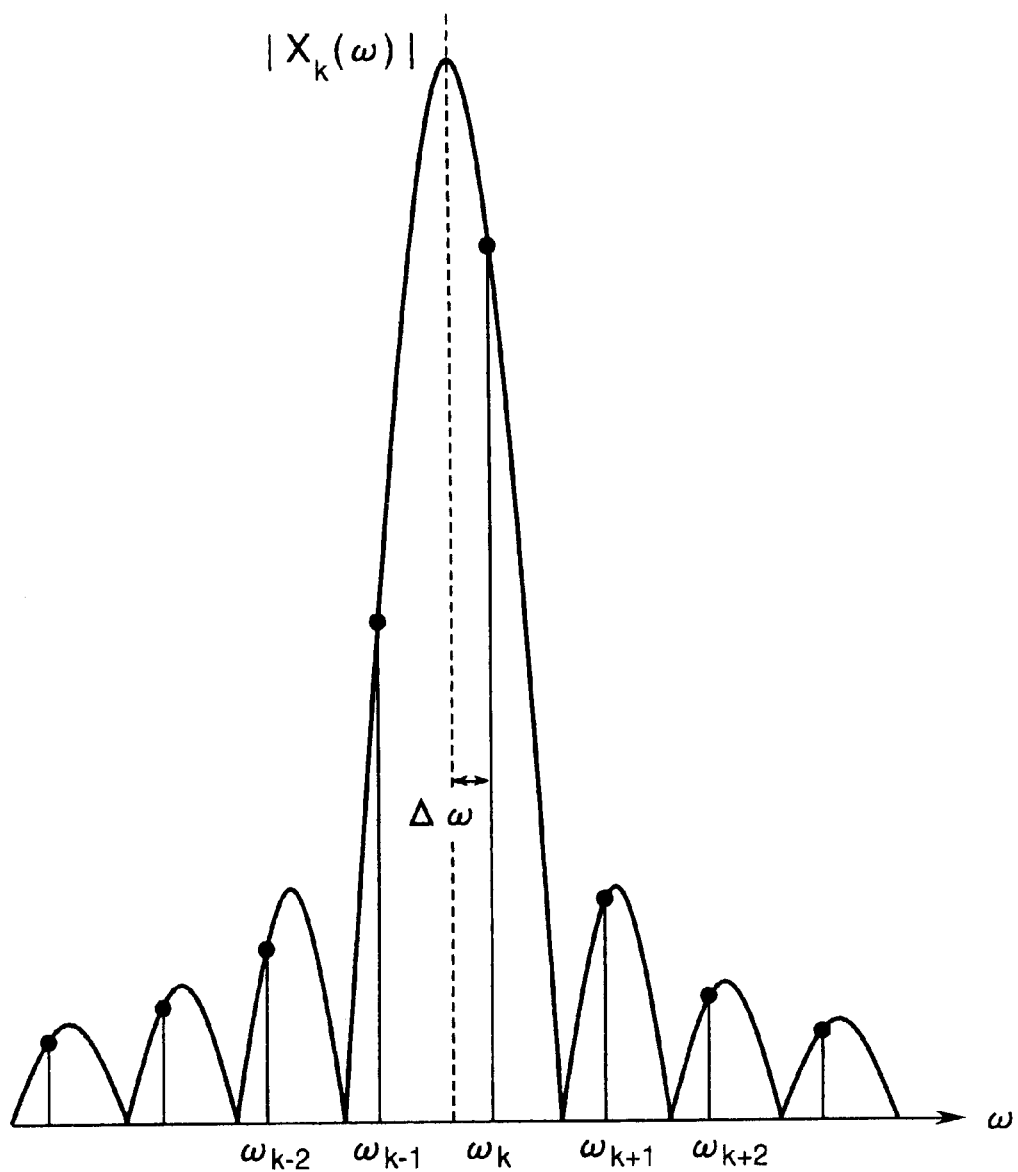
FIG. 5 is a similar graph, illustrating the effect of frequency deviation.

The absolute value $|X'_k(\omega)|$ of this Fourier transform is shown in FIG. 5 for a case in which $\Delta\omega$ of is less than the subcarrier frequency spacing $F_s$.

In FIG. 5, since $X'_i(\omega_k)=0$ does not hold true for unequal integers i and k (i≠k), the value of the Fourier transform X'(ω) of x'(t) when $\omega=\omega_k$ is given by equation (19).

$$X'(\omega_k) = \sum_{n=-K/2}^{K/2} X'_n(\omega_k) \quad (19)$$

The modified data $Y_0(\omega_k)$, $Y_1(\omega_k)$ and $Y_{-1}(\omega_k)$ obtained by phase modifiers 12A, 12B, and 12C are accordingly given by equations (20) to (23).

$$Y_0(\omega_k) = \sum_{n=-K/2}^{K/2} X'_n(\omega_k) z^*_k \quad (20)$$

$$= \sum_{n=-K/2}^{K/2} X_n(\omega_k - \Delta\omega) z^*_k$$

$$= X_k(\omega_k - \Delta\omega)\exp(j\Delta\omega T_S/2) + \quad (21)$$

$$\sum_{n=-K/2}^{k-1} X_n(\omega_k - \Delta\omega) z^*_k +$$

$$\sum_{n=k+1}^{K/2} X_n(\omega_k - \Delta\omega) z^*_k$$

$$Y_1(\omega_k) = X_{k-1}(\omega_k - \Delta\omega)\exp(j\Delta\omega T_S/2) + \quad (22)$$

$$\sum_{n=-K/2}^{k-2} X_n(\omega_k - \Delta\omega) z^*_{k-1} + \sum_{n=k}^{K/2} X_n(\omega_k - \Delta\omega) z^*_{k-1}$$

$$Y_{-1}(\omega_k) = X_{k+1}(\omega_k - \Delta\omega)\exp(j\Delta\omega T_S/2) + \quad (23)$$

$$\sum_{n=-K/2}^{k} X_n(\omega_k - \Delta\omega) z^*_{k+1} + \sum_{n=k+2}^{K/2} X_n(\omega_k - \Delta\omega) z^*_{k+1}$$

When the inverse Fourier transform is applied to the modified data $Y_0(\omega_{-K/2}), \ldots, Y_0(\omega_{K/2})$ output by phase modifier 12A, the first term in equation (21), which is comparatively close to the value given by equation (12), produces a large peak value $y_0(t_p)$ at a particular time value $t_p$. The energy of the other terms in equation (21) is smaller, and is broadly distributed over the time-series values $y_0(t_{-K/2}), \ldots, y_0(t_{K/2})$, so these terms do not contribute greatly to $y_0(t_p)$, or produce other large peaks.

When the inverse Fourier transform is applied to the modified data $Y_1(\omega_{-K/2}), \ldots, Y_1(\omega_{K/2})$ output by phase modifier 12B, since the phases of the terms in equation (22) are aligned with the phases in equation (21), the energy of the first term of equation (22) is concentrated at $y_1(t_p)$, and the energy of the other terms is broadly distributed over $y_1(t_{-K/2}), \ldots, y_1(t_{K/2})$, without contributing greatly to $y_1(t_p)$.

Similarly, when the inverse Fourier transform is applied to the modified data $Y_{-1}(\omega_{-K/2})$, $Y_{-1}(\omega_{K/2})$ output by phase modifier 12C, the energy of the first term in equation (23) is concentrated at $y_{-1}(t_p)$, and the energy of the other terms is distributed over $y_{-1}(t_{-K/2}), \ldots, y_{-1}(t_{K/2})$, without contributing greatly to $y_{-1}(t_p)$.

Inspection of the first terms of equations (22) and (23) shows that $y_1(t_p)$ and $y_{-1}(t_p)$ vary according to the frequency deviation $\Delta\omega$, and provide a sensitive indication of frequency deviations less than the subcarrier spacing $F_s$. By controlling the oscillation frequency of the voltage-controlled oscillator 9 according to the difference between these values $y_1(t_p)$ and $y_{-1}(t_p)$, the frequency-deviation detector 15 is able to detect and correct small frequency errors. In particular, frequency errors less than the subcarrier spacing $F_s$ can be corrected.

Instead of using both $y_1(t_p)$ and $y_{-1}(t_p)$, the frequency-deviation detector 15 can compare just one of these two values with $y_0(t_p)$ to decide how to alter the oscillation. This method is less accurate, but requires less computation.

Third Embodiment

Figure 3:
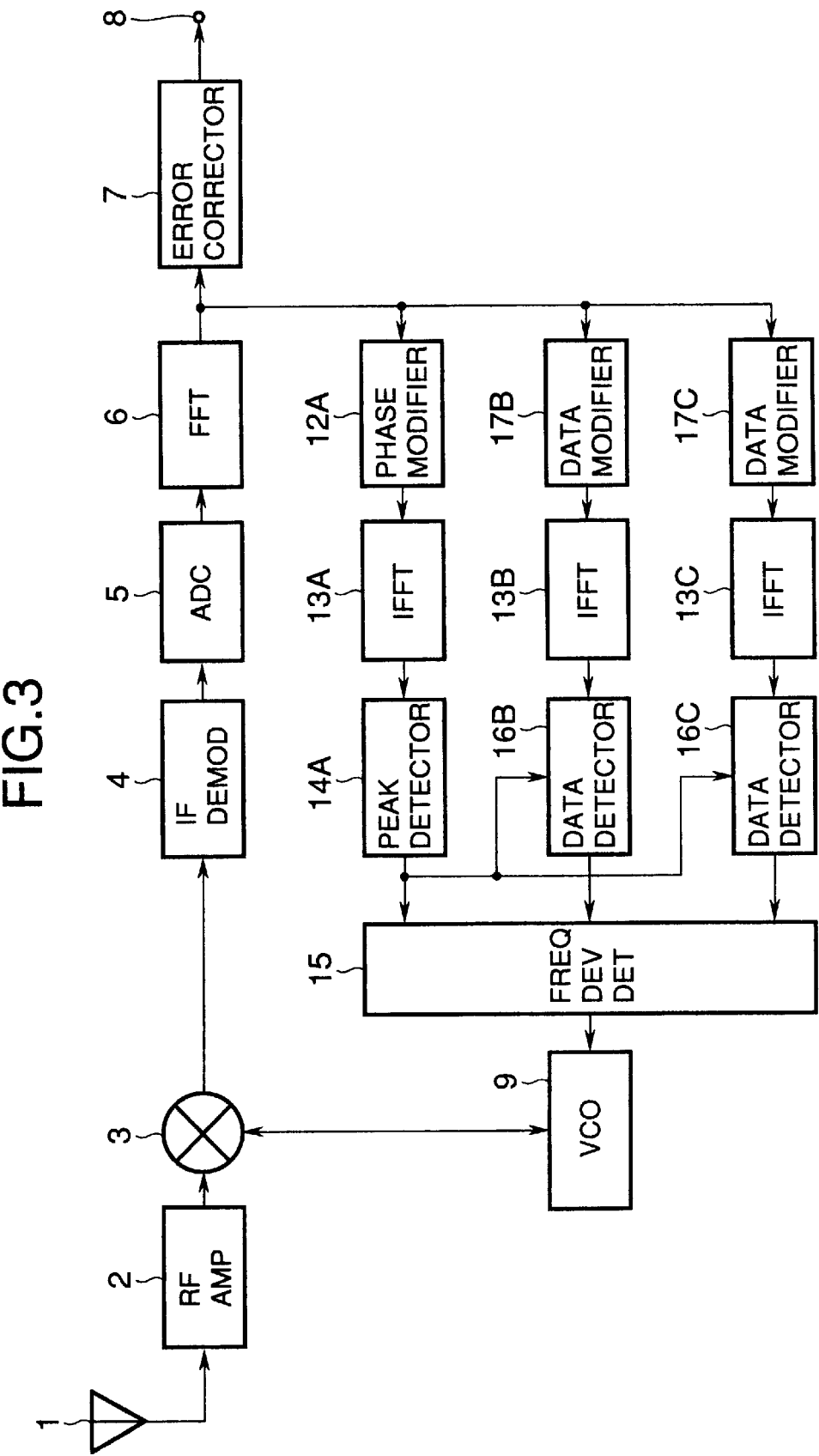
FIG. 3 is a block diagram of a third embodiment of the invented digital broadcast receiver.

A third embodiment of the invented method of tuning control, and a third embodiment of the invented digital broadcast receiver, will be described with reference to the block diagram in FIG. 3. The conventional elements with reference numerals 1 to 9 are the same as in the first embodiment; descriptions will again be omitted.

The novel elements comprise a phase modifier 12A, IFFT processors 13A, 13B, and 13C, a peak detector 14A, data detectors 16B and 16C, and a frequency-deviation detector 15 as in the second embodiment. The data input to IFFT processors 13B and 13C are provided by respective data modifiers 17B and 17C, which modify the output of the FFT processor 6.

Phase modifier 12A produces modified data $V_0(\omega_k)$ equal to $X'(\omega_k)z_k^*$, thus identical to the modified data $Y_0(\omega_k)$ in the preceding embodiments. Data modifiers 17B and 17C, however, subtract the Fourier transform $X(\omega_k)$ of the reference signal $x(t)$ from the array of frequency-domain data $X'(\omega_k)$, and multiply the resulting difference array element-wise by the array of complex conjugates of $x_{k-1}$ or $x_{k+1}$. Specifically, data modifier 17B produces modified data $V_1(\omega_k)$ equal to $[X'(\omega_k)-X(\omega_k)]z_{k-1}^*$. Data modifier 17C produces modified data $V_{-1}(\omega_k)$ equal to $[X'(\omega_k)-X(\omega_k)]z_{k+1}^*$. The Fourier-transform values $X(\omega_k)$ are readily available, because they are equal to the known data $z_k$ multiplied by a constant value equal to $\exp(-j\theta/2)$. The values of $X(\omega_k)$ are preferably computed in advance and stored in the digital broadcast receiver.

Subsequent processing is similar to the second embodiment. Inverse Fourier transforms are applied to the modified data $V_0(\omega_k)$, $V_1(\omega_k)$, and $V_{-1}(\omega_k)$ to produce time-series data $v_0(t)$, $v_1(t)$, and $v_{-1}(t)$, respectively ($t = t_{-K/2}, \ldots, t_{K/2}$). Peak detector 14A detects the peak value of time series $v_0(t)$, outputs this peak value $v_0(t_p)$ to the frequency-deviation detector 15, and outputs the peak time value $t_p$ to data detectors 16B and 16C. Data detectors 16B and 16C supply the corresponding values $v_1(t_p)$ and $v_{-1}(t_p)$ of times series $v_1(t)$ and $v_{-1}(t)$ at time $t_p$ to the frequency-deviation detector 15.

The frequency-deviation detector 15 compares the data received from the peak detector 14A and data detectors 16B and 16C and takes action as in the second embodiment. If $v_1(t_p)$ and $v_{-1}(t_p)$ differ from $v_0(t_p)$ by less than a certain value D, and $v_1(t_p)$ is greater than $v_{-1}(t_p)$, the oscillation frequency of the voltage-controlled oscillator 9 is increased. If $v_1(t_p)$ and $v_{-1}(t_p)$ differ from $v_0(t_p)$ by less than D, and $v_1(t_p)$ is less than $v_{-1}(t_p)$, the oscillation frequency is decreased.

The values of $V_0(\omega_k)$ $V_1(\omega_k)$, and $V_{-1}(\omega_k)$ are given by equations (24), (25), and (26) below.

$$V_0(\omega_k) = \sum_{n=-K/2}^{K/2} X'_n(\omega_k) z_k^* \qquad (24)$$

$$= \sum_{n=-K/2}^{K/2} X_n(\omega_k - \Delta\omega) z_k^*$$

$$= X_k(\omega_k - \Delta\omega)\exp(j\Delta\omega T_S/2) +$$

$$\sum_{n=-K/2}^{k-1} X_n(\omega_k - \Delta\omega) z_k^* +$$

$$\sum_{n=k+1}^{K/2} X_n(\omega_k - \Delta\omega) z_k^*$$

$$V_1(\omega_k) = [X_k(\omega_k - \Delta\omega) - X_k(\omega_k)] z_{k-1}^* + \qquad (25)$$

$$X_{k-1}(\omega_k - \Delta\omega)\exp(j\Delta\omega T_S/2) +$$

$$\sum_{n=-K/2}^{k-2} X_n(\omega_k - \Delta\omega) z_{k-1}^* + \sum_{n=k+1}^{K/2} X_n(\omega_k - \Delta\omega) z_{k-1}^*$$

$$V_{-1}(\omega_k) = [X_k(\omega_k - \Delta\omega) - X_k(\omega_k)] z_{k+1}^* + \qquad (26)$$

$$X_{k+1}(\omega_k - \Delta\omega)\exp(j\Delta\omega T_S/2) +$$

$$\sum_{n=-K/2}^{k-1} X_n(\omega_k - \Delta\omega) z_{k+1}^* + \sum_{n=k+2}^{K/2} X_n(\omega_k - \Delta\omega) z_{k+1}^*$$

The time-series data $v_0(t_{-K/2}), \ldots, v_0(t_{K/2})$ produced from the modified data $V_0(\omega_{-K/2}), \ldots, V_0(\omega_{K/2})$ are identical to the time-series data $y_0(t_{-K/2}), \ldots, y_0(t_{K/2})$ in the second embodiment. The first term in equation (24) gives rise to a large peak value $v_0(t_p)$ at a particular time value $t_p$, as in the second embodiment.

When the inverse Fourier transform is applied to the modified data $V_1(\omega_{-K/2}), \ldots, V_1(\omega_{K/2})$ output by data modifier 12B, if $\Delta\omega$ is comparatively small, the first term in equation (25) will make only a small contribution to the resulting time-series data, and this contribution will be broadly distributed over $V_1(t_{-K/2}), \ldots, v_1(t_{K/2})$. The contribution of the second term in equation (25) will be larger, and will be concentrated at $v_1(t_p)$, since the phases are aligned as in equation (24). The energy of the other terms in equation (25) will be broadly distributed over $v_1(t_{-K/2}), \ldots, V_1(t_{K/2})$, not contributing greatly to $v_1(t_p)$.

Similarly, when the inverse Fourier transform is applied to the modified data $V_{-1}(\omega_{-K/2}), \ldots, V_{-1}(\omega_{K/2})$, the second term of equation (26) will make a comparatively large contribution at $v_{-1}(t_p)$, while the contributions of the other terms will be distributed over $v_{-1}(t_{-K/2}), \ldots, v_{-1}(t_{K/2})$.

The third embodiment accordingly operates in the same way as the second embodiment, but small frequency deviations $\Delta\omega$ are detected more accurately by $v_1(t_p)$ and $v_{-1}(t_p)$ in the third embodiment than by $y_1(t_p)$ and $y_{-1}(t_p)$ in the second embodiment, because the first terms of equations (25) and (26) are substantially canceled out in the data modifiers 17B and 17C.

The frequency-deviation detector 15 in the third embodiment need not compare $v_1(t_p)$ and $v_{-1}(t_p)$; generally similar results can be obtained by comparing one of these two values with $v_0(t_p)$.

As shown by the embodiments described above, the present invention provides accurate, automatic tuning control over a wide range of frequency deviations, from large to small.

The invention is not limited to the above embodiments. The phase modifiers 12A, 12B, 12C, . . . , IFFT processors 13A, 13B, 13C, . . . , peak detectors 14A, 14B, 14C, . . . , data detectors 16B and 16C, and data modifiers 17B and 17C, which were embodied as separate functional blocks above, can be combined in various ways. For example, a single IFFT processor can be made to carry out all of the computations performed by the plurality of IFFT processors 13A, 13B, 13C, . . . . Alternatively, all of the processing carried out by the novel elements can be executed by a suitably programmed digital signal processor (DSP) or other general-purpose processor.

The method of the first embodiment can be combined with the method of the second or third embodiment, the first embodiment being used for coarse tuning and the second or third embodiment for fine tuning. Alternatively, all three embodiments can be combined, the first embodiment being used for coarse tuning, the second embodiment for fine tuning, and the third embodiment for very fine tuning.

The frequency-deviation detector may operate in various ways not described above. Depending on how the subcarriers are numbered, for example, the actions of increasing and decreasing the oscillation frequency of the voltage-controlled oscillator may be reversed from the above description.

The invention is not limited to QPSK-OFDM, but is applicable to other types of PSK-OFDM as well.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of tuning an oscillation frequency of a local oscillator to receive a PSK-OFDM signal having a phase-reference symbol that encodes known data as phase shifts of subcarriers of the PSK-OFDM signal, comprising the steps of:

receiving and demodulating the phase-reference symbol to obtain an array of frequency-domain data;

multiplying the array of frequency-domain data element-wise by an array of complex conjugates of the known data, assuming a frequency offset of zero between the frequency-domain data and the known data, thereby obtaining a first array of modified data;

multiplying the array of frequency-domain data element-wise by the array of complex conjugates, assuming at least one non-zero frequency offset between the frequency-domain data and the known data, thereby obtaining at least one additional array of modified data;

transforming the first array of modified data to time-domain data by performing an inverse fast Fourier transform, thereby obtaining a first time series;

transforming each additional array of modified data to time-domain data by performing an inverse fast Fourier transform, thereby obtaining at least one additional time series;

detecting a peak value in the first time series;

taking one additional value form each additional time series;

performing comparisons among the peak value and each additional value; and adjusting the oscillation frequency responsive to results of the comparisons.

2. The method of claim 1, wherein said step of multiplying the array of frequency-domain data element-wise the array of complex conjugates assumes at least one positive frequency offset and at least one negative frequency offset, thus obtaining at least two additional arrays of modified data; and said step of transforming each additional array obtains, as the additional time series, at least a second time series corresponding to the positive frequency offset, and a third time series corresponding to the negative frequency offset.

3. The method of claim 2, wherein said step of taking comprises detecting a peak value in each additional time series, and taking the peak value thus detected as the additional value.

4. The method of claim 3, wherein said step of comparing comprises finding a largest peak value among the peak values detected in the first time series and the additional time series.

5. The method of claim 4, wherein said step of controlling comprises:

altering the oscillation frequency in one direction if the largest peak value was detected in the second time series; and altering the oscillation frequency in an opposite direction if the largest peak value was detected in the third time series.

6. The method of claim 1, wherein said step of detecting a peak value in the first time series further comprises detecting a time at which the peak value is attained in the first time series; and said step of taking further comprises taking, from each additional time series, a value corresponding to the time thus detected in the first time series.

7. The method of claim 6, wherein said step of multiplying the array of frequency-domain data element-wise by the array of complex conjugates assumes one positive frequency offset and one negative frequency offset, thus obtaining two additional arrays of modified data; and said step of transforming each additional array obtains, as the additional time series, a second time series corresponding to the positive frequency offset, and a third time series corresponding to the negative frequency offset.

8. The method of claim 7, wherein said step of adjusting further comprises:

altering the oscillation frequency in one direction if the additional value taken from the second time series and the additional value taken from the third time series both differ from the peak value detected in the first time series by less than a certain amount, and the additional value taken from the second time series is greater than the additional value taken from the third time series; and altering the oscillation frequency in an opposite direction if the additional value taken from the second time series and the additional value taken from the third time series both differ from the peak value detected in the first time series by less than a certain amount, and the additional value taken from the second time series is less than the additional value taken from the third time series.

9. The method of claim 1, further comprising:

modifying the array of frequency-domain data by subtracting an array of predetermined values, representing a Fourier transform of the phase-reference symbol, element-wise from the array of frequency-domain data, before the step of multiplying the array of frequency-domain data element-wise by the array of complex conjugates in which at least one non-zero frequency offset between the frequency-domain data and the known data is assumed.

10. The method of claim 9, wherein said step of multiplying the array of frequency-domain data element-wise by the array of complex conjugates assumes one positive frequency offset and one negative frequency offset, thus obtaining two additional arrays of modified data; and said step of transforming each additional array obtains, as the additional time series, a second time series corresponding to the positive frequency offset, and a third time series corresponding to the negative frequency offset.

11. The method of claim 10, wherein said step of adjusting further comprises:

altering the oscillation frequency in one direction if the additional value taken from the second time series and the additional value taken from the third time series both differ from the peak value detected in the first time series by less than a certain amount, and the additional value taken from the second time series is greater than the additional value taken from the third time series; and altering the oscillation frequency in an opposite direction if the additional value taken from the second time series and the additional value taken from the third time series both differ from the peak value detected in the first time series by less than a certain amount, and the additional value taken from the second time series is less than the additional value taken from the third time series.

12. A digital broadcast receiver for receiving a PSK-OFDM signal, having a local oscillator with a controllable oscillation frequency, a mixer for down-converting the PSK-OFDM signal to an intermediate-frequency signal by mixing the PSK-OFDM signal with a signal generated by said local oscillator, and demodulating circuits for obtaining an array of frequency-domain data from the intermediate-frequency signal, the array of frequency-domain data representing subcarrier phase information of the PSK-OFDM signal, comprising:

phase modifying means for multiplying the array of frequency-domain data element-wise by an array of complex conjugates of known data encoded in a phase-reference symbol in the PSK-OFDM signal, when the phase-reference symbol is received, assuming different frequency offsets between the frequency-domain data and the known data, thereby obtaining a plurality of arrays of modified data associated with respective frequency offsets;

inverse-fast-Fourier-transform means coupled to said phase modifying means, for transforming respective arrays of modified data to time-domain data, thereby obtaining a plurality of time series associated with respective frequency offsets;

peak detecting means coupled to said inverse-fast-Fourier-transform means, for detecting peak values in respective time series, each peak value thus detected being associated with a different frequency offset among the frequency offsets; and a frequency-deviation detector coupled to said peak detecting means, for selecting a largest peak value among the peak values, and adjusting the oscillation frequency of said local oscillator responsive to the frequency offset associated with the largest peak value.

13. The digital broadcast receiver of claim 12, wherein the frequency offsets comprise at least one positive frequency offset, at least one negative frequency offset, and a frequency offset of zero.

14. The digital broadcast receiver of claim 13, wherein said frequency-deviation detector alters the oscillation frequency in one direction if the positive frequency offset is associated with the largest peak value, and in an opposite direction if the negative frequency offset is associated with the largest peak value.

15. A digital broadcast receiver for receiving a PSK-OFDM signal, having a local oscillator with a controllable oscillation frequency, a mixer for down-converting the PSK-OFDM signal to an intermediate-frequency signal by mixing the PSK-OFDM signal with a signal generated by the local oscillator, and demodulating circuits for obtaining an array of frequency-domain data from the intermediate-frequency signal, the array of frequency-domain data representing subcarrier phase information of the PSK-OFDM signal, comprising:

phase modifying means for multiplying the array of frequency-domain data element-wise by an array of complex conjugates of known data encoded in a phase-reference symbol in the PSK-OFDM signal, when the phase-reference symbol is received, assuming at least two different frequency offsets between the frequency-domain data and the known data, one of the frequency offsets being a frequency offset of zero, thereby obtaining at least two arrays of modified data associated with respective frequency offsets;

inverse-fast-Fourier-transform means coupled to said phase modifying means, for transforming the arrays of modified data to time-domain data, thereby obtaining a plurality of time series associated with respective frequency offsets;

peak detecting means coupled to said inverse-fast-Fourier-transform means, for detecting a peak value in the time series associated with the frequency offset of zero, and detecting a time at which the peak value occurs;

data selecting means coupled to said inverse-fast-Fourier-transform means, for selecting a value from each time series not associated with the frequency offset of zero, corresponding to the time detected by said peak detecting means; and a frequency-deviation detector coupled to peak detecting means, for performing comparisons among the peak value and each value selected by said data selecting means, and adjusting the oscillation frequency of the local oscillator responsive to results of the comparisons.

16. The digital broadcast receiver of claim 15, wherein said phase modifying means assumes one positive frequency offset and one negative frequency offset, in addition to the frequency offset of zero.

17. The digital broadcast receiver of claim 16, wherein said frequency-deviation detector alters the oscillation frequency if both values selected by said data selecting means differ from the peak value by less than a certain amount, the oscillation frequency being altered in a direction depending on which of the values selected by said data selecting means is larger.

18. The digital broadcast receiver of claim 15, wherein when the frequency offset assumed by said phase modifying means is not zero, said phase modifying means modifies the array of frequency-domain data by subtracting an array of predetermined values, representing a Fourier transform of the phase-reference symbol, element-wise from the array of frequency-domain data, before multiplying the array of frequency-domain data element-wise by the array of complex conjugates.

19. A method of tuning an oscillation frequency comprising:

determining a first value of a broadcast signal using a frequency offset of zero;

determining at least one additional value of the broadcast signal using at least one non-zero frequency offset; and adjusting the oscillation frequency based on the first value and the at least one additional value.

20. The method of claim 19, wherein the at least one additional value of the broadcast signal includes at least two values, at least one value determined from a positive frequency offset and at least one value determined from a negative frequency offset.

21. The method of claim 19, wherein
the first value is a peak of a time series produced from the broadcast signal and the frequency offset of zero.

22. The method of claim 21, wherein
the at least one additional value is a peak of a time series produced from the broadcast signal and the at least one non-zero frequency offset.

23. The method of claim 22, wherein said method corrects oscillation frequency errors greater than a subcarrier spacing of the broadcast signal.

24. The method of claim 19, said determining step for determining the first value including,
receiving an array of frequency domain data representing the broadcast signal,
multiplying the array of frequency domain data by an array of complex conjugates with a frequency offset of zero to produce a modified data set,
inverse fast-fourier transforming the modified data set to produce a first time series, and
setting the first value of the broadcast signal equal to a peak of the first time series.

25. The method of claim 19, said determining step for determining the at least one additional value including,
receiving an array of frequency domain data representing the broadcast signal,
multiplying the array of frequency domain data by at least one array of complex conjugates with a non-zero frequency offset to produce at least one modified data set,
inverse fast-fourier transforming the at least one modified data set to produce at least one additional time series, and
setting the at least one additional value of the broadcast signal equal to a peak of the at least one additional time series.

26. The method of claim 19, said adjusting step including selecting the largest of the first value and the at least one additional value, maintaining the oscillation frequency unchanged if the first value is largest and increasing or decreasing the oscillation frequency in accordance with a magnitude of the largest of the at least one additional value if one of the at least one additional values is largest.

27. The method of claim 19, wherein the broadcast signal is represented as an array of frequency domain data.

28. The method of claim 27, wherein the broadcast signal has been intermediate-frequency demodulated, analog-to-digital converted, and fast-fourier transformed.

29. The method of claim 19, wherein
the first value is a peak of a time series produced from the broadcast signal and the frequency offset of zero and
the at least one additional value is a value of a time series produced from the broadcast signal and the at least one non-zero frequency offset at the same time as a time of the peak of the time series produced from the broadcast signal and the frequency offset of zero.

30. The method of claim 29, said adjusting step including increasing, decreasing, or maintaining the oscillation frequency unchanged depending on differences between the first value and the at least one additional values.

31. The method of claim 29, wherein the at least one additional value of the broadcast signal includes at least two values, at least one value determined from a positive frequency offset and at least one value determined from a negative frequency offset.

32. The method of claim 31, said adjusting step including increasing, decreasing, or maintaining the oscillation frequency unchanged depending on a difference between the at least one value determined from a positive frequency offset and the at least one value determined from a negative frequency offset.

33. The method of claim 32, wherein said method corrects oscillation frequency errors smaller than a subcarrier spacing of the broadcast signal.

34. The method of claim 29, said determining step for determining the first value including,
receiving an array of frequency domain data representing the broadcast signal,
multiplying the array of frequency domain data by an array of complex conjugates with a frequency offset of zero to produce a modified data set,
inverse fast-fourier transforming the modified data set to produce a first time series,
setting the first value of the broadcast signal equal to a peak of the first time series and determining a time of the peak of the first time series.

35. The method of claim 29, said determining step for determining the at least one additional value including,
receiving an array of frequency domain data representing the broadcast signal,
multiplying the array of frequency domain data by at least one array of complex conjugates with a non-zero frequency offset to produce at least one modified data set,
inverse fast-fourier transforming the at least one modified data set to produce at least one additional time series, and
setting the at least one additional value of the broadcast signal equal to a value of the at least one additional time series at the same time as a time of a peak of a time series produced from the broadcast signal and the frequency offset of zero.

36. The method of claim 29, said determining step for determining the at least one additional value including,
receiving an array of frequency domain data representing the broadcast signal,
subtracting an array of frequency domain data representing a reference signal from the array of frequency domain data representing the broadcast signal to produce a difference array,
multiplying the difference array by at least one array of complex conjugates with a non-zero frequency offset to produce at least one modified data set,
inverse fast-fourier transforming the at least one modified data set to produce at least one additional time series, and
setting the at least one additional value of the broadcast signal equal to a value of the at least one additional time series at the same time as a time of a peak of a time series produced from the broadcast signal and the frequency offset of zero.

37. The method of claim 36, wherein the at least one additional value of the broadcast signal includes at least two values, at least one value determined from a positive frequency offset and at least one value determined from a negative frequency offset.

38. The method of claim 37, said adjusting step including increasing, decreasing, or maintaining the oscillation frequency unchanged depending on a difference between the at least one value determined from a positive frequency offset and the at least one value determined from a negative frequency offset.

39. The method of claim 38, wherein said method corrects oscillation frequency errors substantially smaller than a subcarrier spacing of the broadcast signal.

40. The method of claim 19, wherein said method is performed by a general purpose processor.

41. The method of claim 19, wherein said method is performed by a digital signal processor(DSP).

42. The method of claim 19, wherein the broadcast signal has been phase-shift keyed and orthogonal frequency-division multiplexed(PSK-OFDM).

43. The method of claim 42, wherein the broadcast signal has been quadrature phase-shift keyed(QPSK).

44. A digital broadcast receiver for tuning an oscillation frequency comprising:

a first detecting circuit for determining a first value of a broadcast signal using a frequency offset of zero;

a second detecting circuit for determining at least one additional value of the broadcast signal using at least one non-zero frequency offset; and a frequency deviation detector for adjusting the oscillation frequency based on the first value and the at least one additional value.

45. The digital broadcast receiver of claim 44, wherein the at least one additional value of the broadcast signal includes at least two values, at least one value determined from a positive frequency offset and at least one value determined from a negative frequency offset.

46. The digital broadcast receiver of claim 44, wherein the first value is a peak of a time series produced from the broadcast signal and the frequency offset of zero.

47. The digital broadcast receiver of claim 46, wherein the at least one additional value is a peak of a time series produced from the broadcast signal and the at least one non-zero frequency offset.

48. The digital broadcast receiver of claim 47, wherein said frequency deviation detector corrects oscillation frequency errors greater than a subcarrier spacing of the broadcast signal.

49. The digital broadcast receiver of claim 44, said first detecting circuit determining the first value by, receiving an array of frequency domain data representing the broadcast signal, multiplying the array of frequency domain data by an array of complex conjugates with a frequency offset of zero to produce a modified data set, inverse fast-fourier transforming the modified data set to produce a first time series, and setting the first value of the broadcast signal equal to a peak of the first time series.

50. The digital broadcast receiver of claim 44, said second detecting circuit determining the at least one additional value by, receiving an array of frequency domain data representing the broadcast signal, multiplying the array of frequency domain data by at least one array of complex conjugates with a non-zero frequency offset to produce at least one modified data set, inverse fast-fourier transforming the at least one modified data set to produce at least one additional time series, and setting the at least one additional value of the broadcast signal equal to a peak of the at least one additional time series.

51. The digital broadcast receiver of claim 44, said frequency deviation detector selecting the largest of the first value and the at least one additional value, maintaining the oscillation frequency unchanged if the first value is largest and increasing or decreasing the oscillation frequency in accordance with a magnitude of the largest of the at least one additional value if one of the at least one additional values is largest.

52. The digital broadcast receiver of claim 44, wherein the broadcast signal is represented as an array of frequency domain data.

53. The digital broadcast receiver of claim 52, wherein the broadcast signal has been intermediate-frequency demodulated, analog-to-digital converted, and fast-fourier transformed.

54. The digital broadcast receiver of claim 44, wherein the first value is a peak of a time series produced from the broadcast signal and the frequency offset of zero and the at least one additional value is a value of a time series produced from the broadcast signal and the at least one non-zero frequency offset at the same time as a time of the peak of the time series produced from the broadcast signal and the frequency offset of zero.

55. The digital broadcast receiver of claim 54, said frequency deviation detector increasing, decreasing, or maintaining the oscillation frequency unchanged depending on differences between the first value and the at least one additional values.

56. The digital broadcast receiver of claim 54, wherein the at least one additional value of the broadcast signal includes at least two values, at least one value determined from a positive frequency offset and at least one value determined from a negative frequency offset.

57. The digital broadcast receiver of claim 56, said frequency deviation detector increasing, decreasing, or maintaining the oscillation frequency unchanged depending on a difference between the at least one value determined from a positive frequency offset and the at least one value determined from a negative frequency offset.

58. The digital broadcast receiver of claim 57, wherein said frequency deviation detector corrects oscillation frequency errors smaller than a subcarrier spacing of the broadcast signal.

59. The digital broadcast receiver of claim 54, said first detecting circuit determining the first value by, receiving an array of frequency domain data representing the broadcast signal, multiplying the array of frequency domain data by an array of complex conjugates with a frequency offset of zero to produce a modified data set, inverse fast-fourier transforming the modified data set to produce a first time series, setting the first value of the broadcast signal equal to a peak of the first time series and determining a time of the peak of the first time series.

60. The digital broadcast receiver of claim 54, said detecting circuit determining the at least one additional value by, receiving an array of frequency domain data representing the broadcast signal, multiplying the array of frequency domain data by at least one array of complex conjugates with a non-zero frequency offset to produce at least one modified data set, inverse fast-fourier transforming the at least one modified data set to produce at least one additional time series, and setting the at least one additional value of the broadcast signal equal to a value of the at least one additional time series at the same time as a time of a peak of a time series produced from the broadcast signal and the frequency offset of zero.

61. The digital broadcast receiver of claim 54, said second detecting circuit determining the at least one additional value by, receiving an array of frequency domain data representing the broadcast signal, subtracting an array of frequency domain data representing a reference signal from the array of frequency domain data representing the broadcast signal to produce a difference array, multiplying the difference array by at least one array of complex conjugates with a non-zero frequency offset to produce at least one modified data set, inverse fast-fourier transforming the at least one modified data set to produce at least one additional time series, and setting the at least one additional value of the broadcast signal equal to a value of the at least one additional time series at the same time as a time of a peak of a time series produced from the broadcast signal and the frequency offset of zero.

62. The digital broadcast receiver of claim 61, wherein the at least one additional value of the broadcast signal includes at least two values, at least one value determined from a positive frequency offset and at least one value determined from a negative frequency offset.

63. The digital broadcast receiver of claim 62, said frequency deviation detector increasing, decreasing, or maintaining the oscillation frequency unchanged depending on a difference between the at least one value determined from a positive frequency offset and the at least one value determined from a negative frequency offset.

64. The digital broadcast receiver of claim 63, wherein said frequency deviation detector corrects oscillation frequency errors substantially smaller than a subcarrier spacing of the broadcast signal.

65. The digital broadcast receiver of claim 44, wherein the broadcast signal has been phase-shift keyed and orthogonal frequency-division multiplexed(PSK-OFDM).

66. The digital broadcast receiver of claim 65, wherein the broadcast signal has been quadrature phase-shift keyed (QPSK).

67. A method of tuning an oscillation frequency, comprising:

receiving and demodulating a PSK-OFDM signal, thereby obtaining an array of frequency-domain data;

multiplying the array of frequency-domain data by a known array of complex conjugates, with different frequency offsets, thereby obtaining a plurality of product arrays;

transforming the product arrays, using an inverse fast Fourier transform, thereby obtaining a plurality of time series;

detecting a peak value in one of the time series, and one additional value from each other one of the time series;

performing comparisons among the peak value and each said additional value; and adjusting the oscillation frequency responsive to results of the comparisons.

68. The method of claim 67, further comprising intermediate-frequency demodulating of the PSK-OFDM signal.

69. The method of claim 67, wherein said method is performed by a general-purpose processor.

70. The method of claim 67, wherein said method is performed by a digital signal processor (DSP).

71. The method of claim 67, wherein said PSK-OFDM signal has been quadrature phase-shift keyed (QPSK).

72. A digital broadcast receiver for receiving a PSK-OFDM signal, having a local oscillator with a controllable oscillation frequency, comprising:

means for receiving and demodulating the PSK-OFDM signal, thereby obtaining an array of frequency-domain data;

means for multiplying the array of frequency-domain data by a known array of complex conjugates, with different frequency offsets, thereby obtaining a plurality of product arrays;

means for transforming the product arrays, using an inverse fast Fourier transform, thereby obtaining a plurality of time series;

means for detecting a peak value in one of the time series, and one additional value from each other of the time series;

means for performing comparisons among the peak value and each said additional value; and means for adjusting the oscillation frequency responsive to results of the comparisons.

73. The digital broadcast receiver of claim 72, further comprising mixing means for using the local oscillator to demodulate the PSK-OFDM signal to an intermediate frequency.

74. The method of claim 72, wherein said PSK-OFDM signal has been quadrature phase-shift keyed (QPSK).

75. A method of tuning a PSK-OFDM signal comprising:

receiving and demodulating the PSK-OFDM signal, multiplying an array of frequency domain data representing the PSK-OFDM signal by an array of complex conjugates, transforming the array using an inverse fast Fourier transform to produce a time series, detecting a peak value in the time series, taking an additional value from each of a plurality of additional time series, performing comparisons among the peak value and the additional values, and adjusting an oscillation frequency responsive to results of the comparisons.

* * * * *